United States Patent [19]

Betzmeir et al.

[11] 4,036,685
[45] July 19, 1977

[54] METHOD AND APPARATUS FOR DETECTING THE LEAK OF COOLANT INTO THE JACKET OF A NUCLEAR REACTOR FUEL ROD

[75] Inventors: Helmut Betzmeir, Langensendelbach; Hans Lettau, Baiersdorf, both of Germany

[73] Assignee: Siemens Aktiengesellschaft, Munich, Germany

[21] Appl. No.: 275,551

[22] Filed: July 27, 1972

[30] Foreign Application Priority Data

July 28, 1971 Germany .............................. 2137641

[51] Int. Cl.$^2$ .............................................. G21C 3/16
[52] U.S. Cl. .................................. 176/19 LD; 176/79; 176/80; 176/68
[58] Field of Search .................. 176/19 R, 19 LD, 50, 176/68, 80, 79

[56] References Cited

U.S. PATENT DOCUMENTS 3,037,924  6/1962  Creutz .................................. 176/68
3,240,681  3/1966  Waine et al. .......................... 176/79
3,243,352  3/1966  Boudouresques ...................... 176/79
3,406,094  10/1968  Beisswenger et al. ................. 176/68
3,697,377  10/1972  Gauthron .............................. 176/68

FOREIGN PATENT DOCUMENTS 947,715  1/1964  United Kingdom .................... 176/80
913,920  12/1962  United Kingdom .................... 176/80

Primary Examiner—Harvey E. Behrend
Attorney, Agent, or Firm—Kenyon & Kenyon, Reilly, Carr & Chapin

[57] ABSTRACT

A method and apparatus for detecting the leakage of coolant into the jacket of a nuclear reactor fuel rod. The apparatus includes a coolant absorbing means mounted at a predetermined location within the jacket. Upon leakage of coolant and absorption thereof pressure forces developed by the absorbing means locally deform the jacket. Periodic inspection of the jacket's exterior by gauges, optical instruments or the like, reveals the presence of such deformation thereby indicating the presence of coolant leakage.

3 Claims, 3 Drawing Figures

METHOD AND APPARATUS FOR DETECTING THE LEAK OF COOLANT INTO THE JACKET OF A NUCLEAR REACTOR FUEL ROD

BACKGROUND OF INVENTION

1. Field of the Invention

The invention relates to method and apparatus for detecting the leakage of coolant into the jacket of a nuclear-reactor fuel rod, by means of a member disposed within the jacket, which reacts to the coolant, thereby deforming the jacket to provide a visible indication of leakage.

2. Description of the Prior Art

Presently known apparatus and method for detecting coolant leakage into the jackets of nuclear reactor fuel rods comprise the detection of phenomena not apparent by inspection of the jackets. For example, a cup-shaped ferromagnetic body is arranged within the generally tubular jacket of a nuclear reactor fuel rod and a sphere is arranged therein. The sphere is suspended on a wire attached to a cap of the jacket. The ferromagnetic, cup-shaped body is filled with a material which disintegrates under the action of coolant and which, when not exposed to the coolant, prevents the ferromagnetic body from being released by the sphere.

The filler material is in the shape of a rod and encloses the sphere. As the free edge of the ferromagnetic body is bent inward, a bond results between the body, the filler material and the sphere. The bond is destroyed if coolant enters, because of the disintegration of the filler material by the coolant. The ferromagnetic body then falls and comes to rest on the surface of the nuclear fuel contained within the jacket. The change in position of the ferromagnetic body can be detected from outside the jacket by suitable measuring means, without the necessity of changing the position of the fuel rod.

The known apparatus and method, however, can be used only in fuel rods which have a sufficiently long distance for the ferromagnetic body to fall. Furthermore, the cost of the measuring apparatus is relatively high. A measurement can be falsified by other magnetic elements incorporated within the reactor, for instance, spacers or the like.

SUMMARY OF THE INVENTION

It is therefore an object of the invention to provide apparatus and method for detecting coolant leaks into nuclear reactor fuel rod jackets, which is usable for all kinds of fuel elements.

It is a further object of the invention to provide such method and apparatus, of such nature that the cost of determining the presence or absence of leakage and the probability of obtaining a false indication of leakage are low, compared to the prior art.

In accordance with the invention, a coolant absorbing means is mounted at a predetermined location within the jacket of a nuclear reactor fuel rod. The absorbing means has a predetermined shape for deriving pressure forces directed against the jacket when coolant is absorbed thereby. Upon leakage of coolant into the jacket, and absorption thereof, the coolant absorbing means expands locally deforming the jacket. The deformation is detectable by gauges, optical instruments and the like, thereby providing an accurate and inexpensive indication of coolant leakage.

DESCRIPTION OF THE PREFERRED EMBODIMENTS

Figure 1:
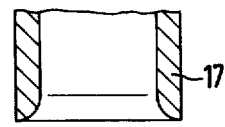
FIG. 1 showns a schematic representation, in partial cross-section, of a portion of a jacketed nuclear reactor fuel rod incorporating coolant absorbing means in accordance with the present invention.
Figure 1:
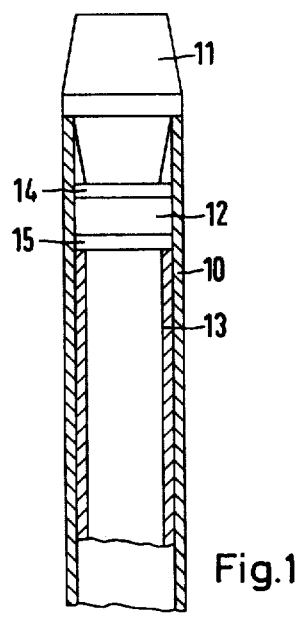

A nuclear reactor of conventional construction includes a plurality of nuclear reactor fuel elements each encapsulated or enclosed within a jacket 10, which can be of tubular shape as illustrated. The jacket 10 is sealed to prevent entry of reactor coolant, and has an end cap 11.

In accordance with the invention, a coolant absorbing means 12 is mounted at a predetermined position within the jacket 10, preferably at the end thereof which is conveniently accessible when the rod is incorporated in a reactor, so that the rod need not be removed from the reactor to determine if coolant has leaked therein. A sleeve 13 and support members 14, 15 are used to mount and support the coolant absorbing means 12, while at the same time exposing means 12 to any coolant leakage into the jacket.

Figure 2:
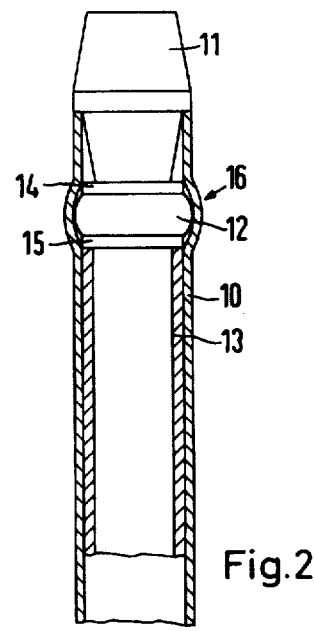
FIG. 2 shows the apparatus of FIG. 1 after coolant has leaked into the fuel rod jacket.

For use in a water cooled nuclear reactor, the coolant absorbing means 12 is made of a material selected from the group consisting of magnesium oxide or mixture of magnesium oxide and aluminum oxide. Preferably, the material is sintered by conventional techniques, and formed into a predetermined shape so that pressure forces derived by the expansion of the material as it absorbs coolant leaking into the jacket 10, are substantially directed against the jacket 10 to dilate or deform it locally, as shown at 16 in FIG. 2, thereby providing a visible indication of coolant leakage, which can be on the order of a few thousandths inch, and detectable by use of a conventional guage, shown as sleeve 17 (FIG. 2), or where desired sufficiently great to be detectable by visual inspection alone. Advantageously, such deformation can be detected without removing the jacketed fuel rod from the reactor assembly. It will be apparent to those of skill in the art that optical instruments of conventional construction can be used to detect local dilation or deformation 16 of the jacket 10.

Figure 3:
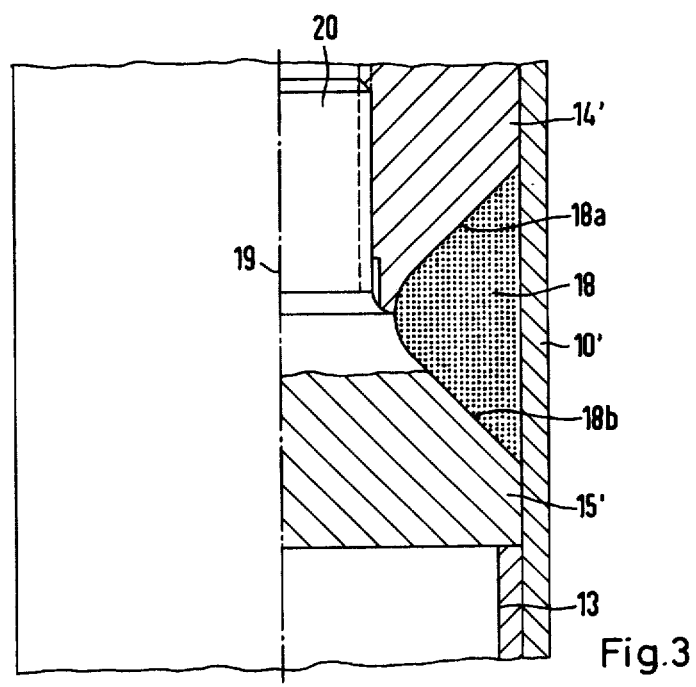
FIG. 3 shows another embodiment of coolant absorbing means, which can be incorporated into jacketed nuclear reactor fuel rods of the kind illustrated in FIGS. 1 and 2.

Referring to FIG. 3, a coolant absorbing means 18 of shape particularly suitable for use in tubular jacketed nuclear reactor fuel rods is shown. The absorbing means 18 is formed in a ring-shape, having a substantially triangular cross-section; the apex of this cross-section is directed toward the axis 19 of the tubular jacket 10'. Support members 14', 15', and 20 secure the absorbing means 18 at a predetermined location within the jacket 10'. The ring-shape and its inwardly inclined faces 18a, 18b, in combination with the support members 14', 15' act to direct the pressure forces generated by means 18, upon absorption of coolant, radially of the tubular jacket 10'.

While the specifically illustrated embodiments of the invention are shown in the environment of a tubular shaped nuclear reactor fuel rod, it will be apparent to those skilled in the art that the invention is usable in reactor rods of shape other than tubular, for the purpose of developing dilations or deformations of the jackets thereof upon expansion of appropriately shaped coolant absorbant means therein.

It will also be apparent to those of skill in the art that the invention can be employed in non-water cooled nuclear reactors, by appropriate selection of a material which expands upon absorption of the reactor coolant.

What is claimed is:

1. For use in a nuclear reactor incorporating water as the coolant thereof, a nuclear fuel rod including a nuclear fuel element and a jacket enclosing said element wherein the improvement comprises a coolant absorbing means mounted within said jacket for indicating the entry of coolant into said jacket; and means for mounting said absorbing means in an abutting relationship with respect to the inner wall of said jacket, at a predetermined location adjacent one end thereof; the combination being so constructed and arranged that upon entry of coolant into said jacket, said absorbing means expands radially of said jacket in response thereto to deform said jacket in a radial direction thereby indicating the presence of coolant therewithin, and wherein said absorbing means is made of a sintered material selected from the group consisting of magnesium oxide and a mixture of magnesium oxide and aluminum oxide, said absorbing means having a substantially cylindrical shape, with the side wall thereof abutting the inner wall of said jacket, for deriving pressure forces substantially directed radially against said jacket when absorption of coolant causes the expansion of said absorbing means, and wherein said absorbing means is ring-shaped.

2. The nuclear fuel rod according to claim 1 wherein the cross-section of said ring-shape is substantially triangular, the apex thereof being directed toward the axis of said jacket.

3. The method of detecting leaks of coolant into the jacket of a nuclear fuel rod in a water cooled nuclear reactor comprising the steps of
   a. positioning a water absorbing sintered material selected from the group consisting of magnesium oxide and mixtures of magnesium oxide and aluminum oxide within the jacket of said fuel rod, in an abutting relationship with respect to the inner wall of said jacket, at a predetermined position adjacent one end thereof;
   b. shaping said material into a substantially cylindrical form to derive pressure forces therefrom substantially directed radially of said jacket when the side wall of said cylindrical form abuts the inner wall of said jacket and coolant is absorbed by said material, and
   c. inspecting the outer wall portions of said jacket at said predetermined position to determine the presence of jacket deformation in a radial direction at said outer wall portions, said deformation being indicative of a coolant leak into said jacket.

* * * * *